(12) United States Patent
Finger et al.

(10) Patent No.: US 11,338,374 B2
(45) Date of Patent: May 24, 2022

(54) METHOD FOR MANUFACTURING A THIN-WALLED PART

(71) Applicant: GF Machining Solutions AG, Langnau i.E. (CH)

(72) Inventors: Andreas Finger, Hettiswil (CH); Tim Day, Langnau (CH)

(73) Assignee: GF Machining Solutions AG, Langnau (CH)

( * ) Notice: Subject to any disclaimer, the term of this patent is extended or adjusted under 35 U.S.C. 154(b) by 0 days.

(21) Appl. No.: 17/119,556

(22) Filed: Dec. 11, 2020

(65) Prior Publication Data

US 2021/0178495 A1  Jun. 17, 2021

(30) Foreign Application Priority Data

Dec. 12, 2019  (EP) ..................................... 19215452

(51) Int. Cl.
*B23C 3/18* (2006.01)

(52) U.S. Cl.
CPC ...................................... *B23C 3/18* (2013.01)

(58) Field of Classification Search
CPC ............ B23C 2215/44; B23C 2215/52; B23C 2215/56; B23C 2215/48; Y10T 29/4932; Y10T 29/49316; Y10T 29/49336
See application file for complete search history.

(56) References Cited

U.S. PATENT DOCUMENTS

| | | | |
|---|---|---|---|
| 4,596,501 A | 6/1986 | Wu | |
| 2004/0193308 A1* | 9/2004 | Darcy, Jr. | .......... G05B 19/4163 700/182 |
| 2009/0304473 A1 | 12/2009 | Holze et al. | |
| 2017/0016332 A1 | 1/2017 | Cooper et al. | |
| 2018/0258945 A1* | 9/2018 | Lotz | ........................ B23C 3/18 |

FOREIGN PATENT DOCUMENTS

| | | |
|---|---|---|
| EP | 0992310 A2 | 4/2000 |
| EP | 0992310 A3 | 6/2002 |

OTHER PUBLICATIONS

Extended European Search Report for Application No. 19215452.4 dated Jun. 30, 2020 (8 pages).

* cited by examiner

*Primary Examiner* — Jason L Vaughan
*Assistant Examiner* — Amanda Kreiling
(74) *Attorney, Agent, or Firm* — Harness, Dickey & Pierce, P.L.C.

(57) ABSTRACT

A method for manufacturing a thin-walled part having curved surfaces, in particular a turbine blade by a machine tool comprising roughing process and semi-finishing process. At least one of the roughing process and the semi-finishing process is accomplished by flank milling.

6 Claims, 4 Drawing Sheets

METHOD FOR MANUFACTURING A THIN-WALLED PART

CROSS-REFERENCE TO RELATED APPLICATION

This application claims the benefit and priority of European Patent Application No. 19 215 452.4 filed Dec. 12, 2020. The entire disclosure of the above application is incorporated herein by reference.

FIELD OF THE INVENTION

The present invention is directed to a method for manufacturing a thin-walled part, in particular, a turbine blade. In further, the present invention is directed to a machine tool to manufacture the thin-walled part.

BACKGROUND OF THE INVENTION

The process of manufacturing parts or components having a thin-walled and curved surface can be challenging because beside the complex shape to be achieved, for many applications the machined part must fulfill high quality requirement. Therefore, a multi-axis machine tool is needed to accomplish the complex shape. Since the thin-walled workpiece has low stiffness, additional problems can be raised during the machining, such as, process-related static displacements and vibration of the workpiece. The vibration of the workpiece causes poor surface quality of the machined workpiece and even reduces the life-time of the tool. In addition, the force acted on the workpiece is limited to avoid static displacements. This reduces processing efficiency.

Considering these problems associated to the manufacturing of the thin-walled workpieces, machining set-up is crucial to guarantee the surface quality of the machined part and to achieve a high processing efficiency. In order to achieve these goals, optimizing the machining parameters such as federate and spindle speed is essential. Usually the machining parameters are selected such that a stable process can be obtained. However, the process efficiency may be low, in particular in term of machining time.

One type of thin-walled part is gas turbine engine rotor blades including an airfoil, a platform, shank and dovetail. In further, a fillet connects the platform and the shank. The fillet has in general a concave shape. Other types of thin-walled part are turbine and impeller blades for the aerospace applications. High safety and quality are of the utmost importance for these applications.

Today such thin-walled parts are machined by spiral-point milling or strip milling. The point milling is defined as a milling process whereby the material is removed by the end of the cutter. The strip milling consumes less machining time than the point milling since the depth of the mill is deeper than the point milling. However, the strip milling is still disadvantageous in that it is time-consuming.

Flank milling is a milling process in which a large axial depth of cut can be achieved with end milling tools. This process is of high importance, in particular in view of the high cutting speed and relatively small radial depths of cut. US 20090304473 discloses a method for milling a blisk for a gas-turbine engine. This method comprises preshaping a multitude of integrally provided three-dimensional blisk blades at a periphery of a disk blank by rough milling and finish milling pressure and suction sides of the blades. The finish milling is accomplished by flank milling.

US 2017/0016332 discloses a method for designing and manufacturing flank millable components. This method provides the possibility that a user is notified when a component geometry option is selected that result in the component not being flank millable. In further, using this method the user is prevented from selecting a geometry option that would result in the component not being flank millable.

However, today the common procedure to mill a single blade platform is still spiral-point milling or strip milling, which has the disadvantageous of high carbide burn and long machining time.

SUMMARY OF THE INENTION

It is an aspect of this invention to provide a method to manufacture a thin-walled part with an improved machining efficiency. It is in particular an objective of this invention to provide a method to manufacture a turbine blade with a reduced tool wear without compromising the productivity.

In the present invention, a method for manufacture a thin-walled part having curved surfaces, in particular a turbine blade comprises roughing process and semi-finishing process. At least one of the roughing process and the semi-finishing process is accomplished by flank milling. This has the advantage of increasing the material removal rate without violating the constraints such as tool life, the quality of the manufactured part.

Flank milling is one of the important types of milling, in particular, for manufacturing aircraft structural parts, turbines, blades and several other mechanical parts. Flank milling cuts with the side of the cutting tool and thereby can remove a large amount of material in a single pass. For example, a turbine blade can be quickly obtained by machining a ruling, namely a workpiece in one pass by aligning the side of a cutting tool to the rulings. If point milling is applied, many passes are needed and consequently longer machining time is required. Therefore, flank milling can reduce manufacturing time, enhance the surface quality and reduce cost.

Roughing is a process in which a large amount of material is removed and the surface quality is poor. Semi-finishing is a process in which a small amount of material is removed in order to achieve high surface quality. When the thin-walled part, for example the turbine blade must be manufactured by milling, roughing the workpiece to obtain components of the blade, such as the platform and the fillet radius of the turbine blade is one of the most critical operation. In order to reduce the machining time and thereby reduce the manufacturing cost per blade, the material removal rate should be high. In know methods, this step is carried out by spiral point milling, which causes a high carbide burn and long machining time. Employing the flank milling can reduce the carbide burns dramatically and at the same time shorten the machining time. Additionally, cutting tools used in flank milling are generally more expensive than the cutting tools for point milling, because cutting teeth along the full length are necessary and solid carbide tooling is used for the stiffness. Thus, reducing the carbide burns can increase the tool life, thereby the cost of the production can be reduced.

In preferred embodiments, the cutting tools used for the flank milling is first characterized to obtain characteristic data of the cutting tool and an operation mode is selected based on the obtained characteristic data.

Advantageously, the selected operation mode is process damping mode, in which the turbine blade is machined at a low spindle speed and high depth of cut.

Alternatively, the selected operation mode is a stable mode in which the spindle speed is higher than the process damping mode and the depth of cut is smaller than the process damping mode.

In a preferred embodiment, based on the characteristic data of the cutting tool the operation mode is selected to enable a full-slot milling of at least a part of the turbine blade. Full-slot milling means the workpiece is cut in the entire depth of the workpiece, which leads a high machining sufficiency.

Dynamic deflection, caused by the chatter of the cutting tool during the machining may substantially affect the machining results of complex, thin-walled part. The milling process under chatter-free condition in the stable mode is highly desired. However, the process damping mode enables the full-slot milling. Even in the process damping mode, the spindle speed is low, the total machining time can still be reduced due to the high material remove rate. In addition, the tool wear is reduced. If the full-slot milling is not operated in this mode, the cutting tool maybe broken. Since the entire tool length is used in the full-slot milling, the cutting forces are much higher than point milling, in which only the tool tip is used. This results in deflection of the cutting tool or part.

In order to predict the outcome of a machining process and thus enable its optimization, the structural characteristics of the machine tool, and more specifically its resulting behavior at the tip of the tool used in the machining process, must be precisely known. For instance, in the milling process, predicting the interaction between the structural characteristics of the machine tool under machining conditions and the cutting process allows determining the so-called stability lobes diagram. The stability lobes diagram represents the stability limit of the process subject to self-excited chatter vibrations between cutting tool and workpiece induced by regenerative phenomenon with respect to the rotation speed of the tool, namely spindle and the depth of cut.

To identify the characteristic data, tap testing with an instrumented impact hammer is generally used. An instrumented impact hammer is a device that introduces an excitation force pulse into the test structure by hitting the test structure, for example the tool, and enables the measurement of the generated force by integrating a force sensor. The frequency response function at the tool is determined by measuring the response to the impact force induced in the tool. In order to get the dynamic compliance between the tool and the workpiece, frequency response function must also be measured on the workpiece side and then combined with those obtained on the tool side.

The tap testing enables to identify the characteristic data includes one or more of: spindel speed, depth of cut, stability state and chatter frequency. Depending on the applications, different characteristic data must be derived to determine the machining parameters. For example, spindle speed and depth of cut are essential parameters to avoid dynamic deflections of the flexible thin-walled workpiece, whereas the federate confers the importance on the static deformation of the workpiece.

From the stability lobes generated after the tap testing, the proper machine parameters can be selected to enforce the milling is performed in process damping mode. In the stable operation mode, the allowable maximal depth of cut can be e.g. 5 mm, whereas in the process damping mode the maximal depth of cut can achieve 300 mm In order to further optimize the milling process, in one variant, the method further comprises inputting the characteristic data of the cutting tools and/or characteristic data of the workpiece into a simulation tool to determine the machining parameters applied to machine the turbine blade.

In one preferred embodiment, the method is applied to manufacture a turbine blade having a pressure side and a suction side. The pressure side and the suction side are machined in two steps and at least one of the side is machined by a full-slot milling in process damping mode. However, the roughing and semi-finishing the platform and the fillet radius of the turbine blade can be conducted in one operation.

During manufacturing the blade, a combination of flank milling and spiral point milling is applicable.

In the present invention, a machining tool is used for manufacturing a thin-walled part having curved surfaces, in particular a turbine blade including an airfoil and a platform. The machine tool is configured to conduct the milling comprising roughing process and finishing process based on this method. The machining tool is configured to accomplish the roughing and semifinishing of platform and filletradius of the turbine blade by full-sloting milling in a process damping mode. Depending on the quality requirements, a direct finishing using full-slot milling is also possible.

A controller is arranged in the machine tool and is configured to control the machine. The machining parameters obtained based on the characterizing data are supplied to the controller to ensure a high efficiency milling process.

BRIEF DESCRIPTION OF THE DRAWINGS

In order to describe the manner in which advantages and features of the disclosure can be obtained, in the following a more particular description of the principles briefly described above will be rendered by reference to specific embodiments thereof, which are illustrated in the appended drawings. These drawings depict only exemplary embodiments of the disclosure and are not therefore to be considered to be limiting of its scope. The principles of the disclosure are described and explained with additional specificity and detail through the use of the accompanying drawings in which.

EXEMPLARY EMBODIMENTS

Figure 1:
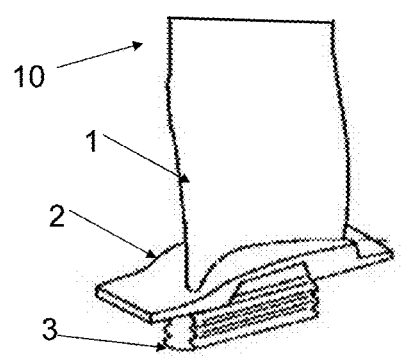
FIG. 1 illustrates a simplified schematic of a single turbine blade

FIG. 1 illustrates a schematic of a single machined turbine blade 10 including an airfoil 1, a platform 2, and a blade root 3, which can be manufactured by the method of the present invention. However, the method of present invention is not limited to machine turbine blade and not limited to this particular shape of the turbine blade. For example, the turbine blade having additionally a shroud can also be machined by this method.

Figure 2:
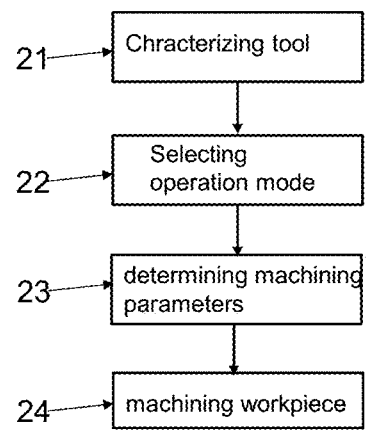
FIG. 2 illustrates the milling method according to present invention.

FIG. 2 shows the main steps included in the method of the present invention: characterizing a cutting tool 21, selecting an operation mode 22, determining machining parameter 23 and machining workpiece 24. Before milling the workpiece by a machine tool, at least one cutting tool used for the milling is characterized for example by a tap testing to identify the critical frequency range regarding the vibration to obtain stability lobes.

Figure 3:
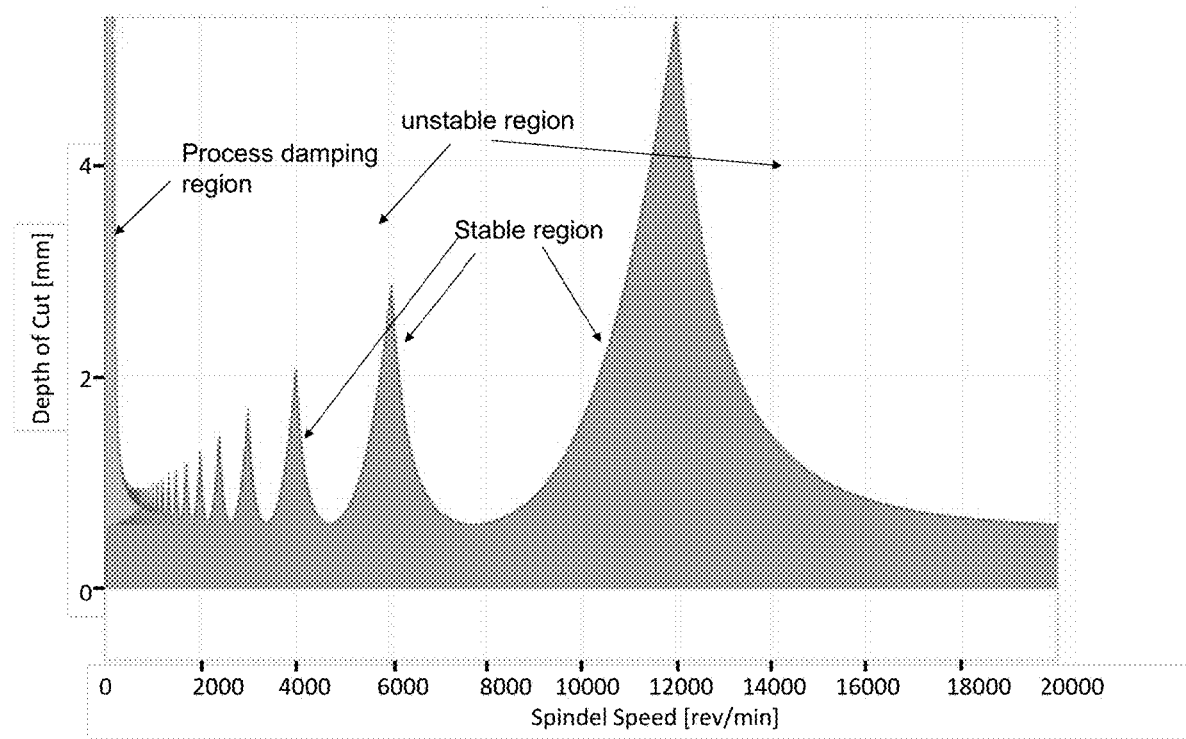
FIG. 3 shows the results of conducted tap testing for two cutting tools.
Figure 4:
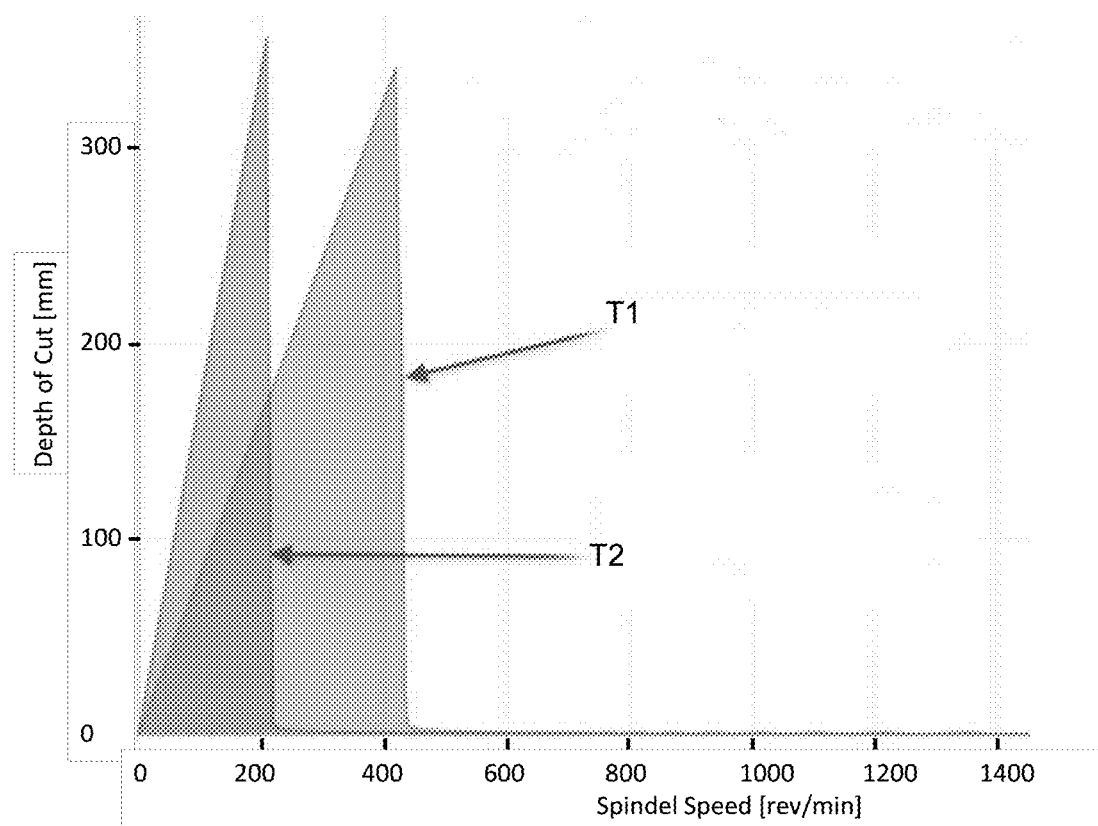
FIG. 4 illustrates results of tap testing.

FIG. 3 shows the results of the conducted tap testing for two cutting tools T1 and T2 depicted in stability lobes. Three operation regions can be derived from the obtained result: unstable region, stable region, process damping region. In the unstable region, the self-excited vibration occurs strongly such that this region should be avoided for the machining. The stable region is normally the desired machining region, since the machining can be accomplished in a stable state and high spindle speed can be selected. For example, the spindle speed of 4000 rev/min can be applied to mill a depth of cut of 2 mm. In the process damping region, the applicable spindle speed is low but a large of depth of cut can be applied. As shown in the FIG. 4 the process damping occur at the spindle speed of 420 rpm and 210 rpm for tools T1 and T2, respectively. The applicable depth of cut are higher than 300 mm. Selecting this operation mode enables a full-slot milling, which reduces the machining time.

The identified spindle speed can be further supplied into a simulation tool to predict for example the relation between the cutting force and the resulting deflection of the workpiece. In this manner, the machining parameters used for the set-up the milling process can be selected properly. In this embodiment, if the operation is not conducted in the process damping range, the full-slot flank milling cannot be used, because the tool will be broken at such high rotation speed. Even relative lower rotation speed is selected, the total machining time required to machine the part is reduced, since the material removal rate is increased dramatically, thereby the productivity is improved. When the maximum tangential cutting force resulting a tolerable deflection can be applied to machine the workpiece, the machining time can be saved without reduction of the quality of the manufactured single blade.

Figure 5:
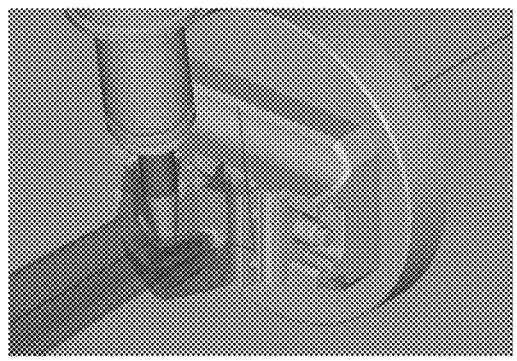
FIG. 5 illustrates the 5-axis flanking milling.
Figure 6:
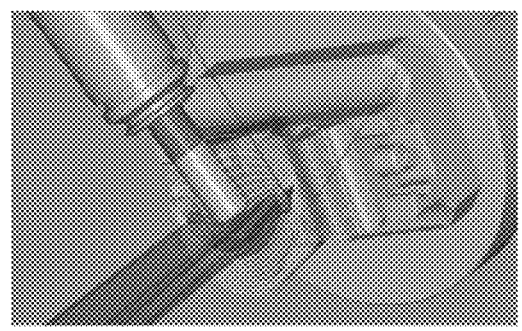
FIG. 6 illustrates an embodiment to mill the single blade.

FIG. 5 shows the full-slot milling a platform using the process damping mode. FIG. 6 shows the case if the stable operation mode is selected. The platform has to be milled in a spiral milling path having a slope of e.g. 2 mm.

The invention claimed is:

1. A method for manufacturing a turbine blade using a cutting tool, the turbine blade includes a platform, the method comprising:
    characterizing the cutting tool to obtain characteristic data of the cutting tool;
    selecting an operation mode based on the obtained characteristic data;
    selecting a process damping mode as the operation mode, in the process damping mode the turbine blade is machined at a low spindle speed and high depth of cut, and the platform undergoes a roughing process;
    inputting the characteristic data of the cutting tool into a simulation tool to determine the machining parameters applied to machine the turbine blade; and
    machining the turbine blade with the roughing process and a semi-finishing process, wherein at least one of the roughing process and the semi-finishing process is accomplished by flank milling.

2. The method according to claim 1, wherein the selected operation mode is a stable mode in which the spindle speed is higher than the process damping mode and the depth of cut is smaller than the process damping mode.

3. The method according to claim 1, wherein based on the characteristic data of the cutting tool the operation mode is selected to enable a full-slot milling of at least a part of the turbine blade.

4. The method according to claim 1, wherein the characterizing the tool is conducted by a tap testing.

5. The method according to claim 1, wherein the characteristic data includes one or more of: spindle speed, depth of cut, stability state and chatter frequency.

6. The method according to claim 1, further comprising obtaining workpiece characteristic data of a workpiece, and inputting the workpiece characteristic data into the simulation tool to determine the machining parameters applied to machine the turbine blade.

* * * * *